(No Model.)
F. A. PHELPS, Jr.
BALANCED THROTTLE VALVE.
No. 553,040.  Patented Jan. 14, 1896.
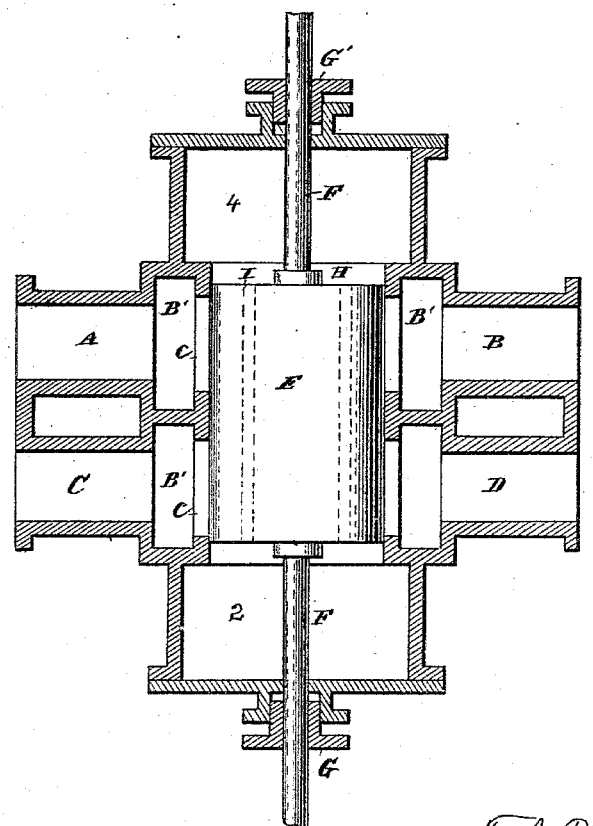
Witnesses
Norris S. Clark.
N. F. Oberly
Inventor
F. A. Phelps Jr.
By his Attorneys
Dyer & Seely.

UNITED STATES PATENT OFFICE.

FREDERICK A. PHELPS, JR., OF SCHENECTADY, NEW YORK.

BALANCED THROTTLE-VALVE.

SPECIFICATION forming part of Letters Patent No. 553,040, dated January 14, 1896.

Application filed October 24, 1891. Serial No. 409,704. (No model.)

*To all whom it may concern:*

Be it known that I, FREDERICK A. PHELPS, Jr., a citizen of the United States, residing at Schenectady, in the county of Schenectady and State of New York, have invented a certain new and useful Improvement in Balanced Throttle-Valves, of which the following is a specification.

The present invention relates to valves for controlling the passage of air, gas, water or other fluid in any variety of apparatus in which such control is desired.

The object of the invention is to so construct and arrange valves that they shall be nicely balanced in a very simple manner, so that they can be moved to open or close the valveway with a minimum amount of power, no matter what the pressure of the fluid in the system is.

The accompanying drawing illustrates a section of the invention.

As shown the valve-casing is provided with a number of inlet and outlet passages A C B D, of which there may be any suitable number, all being preferably controlled by a single slide-valve J, although it is evidently possible to control them in any desired order by placing several pistons or valves on the same stem instead of one long valve. In this valve the fluid may enter at either end. A chamber 2 is formed beneath the valve and is in communication at intervals with the lower inlet and outlet passages, and a corresponding upper chamber, 4, is in communication with the upper inlet and outlet passages, and the valve is provided with openings I, which connect these chambers and allow the steam or other fluid to simultaneously operate on both ends of the valve, so as to balance the same.

By the simple construction and arrangement described a slide-valve which is accurately balanced at all times, irrespective of any variations in the pressure of fluid in the system, is obtained, since the pressure will be imposed simultaneously on both ends of the valve.

I am aware that it is not broadly new to balance valves controlling fluid-passages—for example, valves which are raised bodily from their seats when opened and moved back when closed—nor is it broadly new to surround a valve with steam whereby the valve is partially balanced; but I am not aware that sliding valves having stems projecting through the casing on both sides of the valves have been balanced in the manner herein set forth—namely, by providing a closed chamber above and below the valve, communicating with each other by means of passages in the valve.

What I claim is—

1. A balanced valve wherein are combined a valve casing, containing a cylindrical valve seat, one or more ports in the sides of such valve seat and closed chambers at opposite ends of said valve seat, and a cylindrical valve sliding in said cylindrical valve seat and controlling the port or ports in the side of said seat, having a valve stem extending in opposite directions from the valve through said closed chambers and out through the valve casing, and also provided with openings through its body for connecting the closed chambers at opposite ends of the valve seat and equalizing the pressure therein, one or both of said closed chambers not being directly connected when the valve is closed with either the inlet or outlet passages in the valve casing, substantially as set forth.

2. A balanced valve wherein are combined a valve casing, containing a cylindrical valve seat, one or more ports in the sides of such valve seat and closed chambers at opposite ends of said valve seat, and a cylindrical valve sliding in said cylindrical valve seat and controlling the port or ports in the side of said seat, having a valve stem extending in opposite directions from the valve through said closed chambers and out through the valve casing, and also provided with openings through its body for connecting the closed chambers at opposite ends of the valve seat and equalizing the pressure therein, and inlet and outlet passages in the valve casing, one of which is directly connected to one of said closed chambers, the other closed chamber having no connection with either of said passages except through the openings in the valve, substantially as set forth.

3. A balanced valve wherein are combined a valve casing containing a valve seat, one or more ports in the walls of said valve seat, chambers at opposite ends of said valve seat, a valve sliding in said valve seat, and having two valve stems extending in opposite directions through said chambers and out through the valve casing, one of said valve stems being of greater diameter than the other, passages in said valve connecting the two chambers, and inlet and outlet passages, substantially as set forth.

This specification signed and witnessed this 21st day of October, 1891.

FREDERICK A. PHELPS, JR.

Witnesses:
HERMANN F. T. ERBEN,
HENRY B. HUGHES.